(No Model.)
B. P. JOLLY.
ANIMAL TRAP.
No. 375,822.   Patented Jan. 3, 1888.
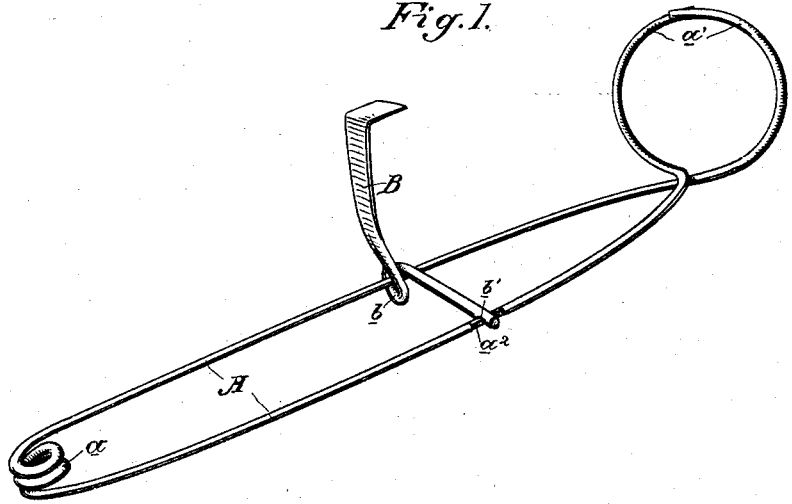
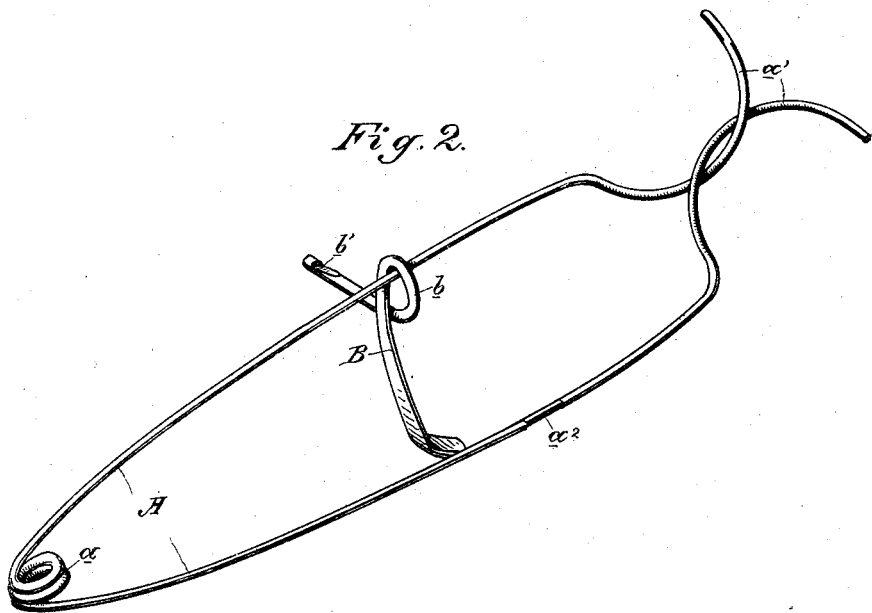

UNITED STATES PATENT OFFICE.

BERTIE P. JOLLY, OF SOLEDAD, CALIFORNIA.

ANIMAL-TRAP.

SPECIFICATION forming part of Letters Patent No. 375,822, dated January 3, 1888.

Application filed June 11, 1887. Serial No. 241,077. (No model.)

*To all whom it may concern:*

Be it known that I, BERTIE PAUL JOLLY, of Soledad, Monterey county, State of California, have invented an Improvement in Animal-Traps; and I hereby declare the following to be a full, clear, and exact description of the same.

My invention relates to that class of animal-traps especially designed for gophers and other similar burrowing animals, which said traps are made of spring-wire arms held in position by a suitable trigger, which is operated automatically by the throwing of the earth against it.

My invention consists in a single piece of spring-wire bent at its center to form a horizontal coil, and having its ends bent at an angle and curved in opposite directions through approximately one hundred and eighty degrees, said ends crossing each other or interlocking, and in a trigger formed by a single piece of wire the ends of which are bent at right angles, one end being provided with a notch for engaging one side of the main spring-wire, and the other being broadened or flattened out to receive the impact of the earth, all of which I shall hereinafter fully describe.

The object of my invention is to provide a simple, cheap, and effective trap.

Referring to the accompanying drawings for a more complete explanation of my invention, Figure 1 is a perspective view of my trap when set. Fig. 2 is a view showing it when sprung.

The main body of the trap is formed of a single piece of spring-wire, A, bent at its center to form a horizontal coil, $a$, and at its ends to form the curved jaws $a'$. These jaws are not bent at a perfect right angle to the sides of the wire, but have a forward pitch, as is shown, enabling the trap to be set in the burrow with greater ease and accuracy and with less liability to spring the trigger, as the top of the jaws more easily avoid the top of the hole. The jaws interlock each other, as shown. B is the trigger, consisting of a single piece of wire bent to form a loop or eye, $b$, whereby it is loosely fitted upon one arm or side of the wire A. One end of the trigger is provided with a notch, $b'$, which engages the flattened portion $a^2$ on the other side of the wire A. The other end of the trigger, which extends at right angles to the first end and upwardly, is preferably broadened or flattened out, as shown.

By referring to Fig. 1 it will be seen that in order to set the trap the two sides of the wire A are pressed together and are held in this position by the engagement of the notched end of the trigger. In this position the semicircular jaws are separated, and form practically a complete circle large enough for the passage of the animal.

The trap is to be set down into the burrow jaws foremost, and open or spread, as described, in which position they conform closely to the walls of the burrow, and are unnoticeable. The coil $a$ being flat, the trap lies firmly in its place. It is a well-known habit of gophers to return to the mouth of the burrow in order to discover the reason for any unusual state of affairs. This is taken advantage of by removing the earth with which they close the mouths of their holes, so as to admit the light. The gopher, upon discovering the light, returns in order to fill the hole again, and, without noticing the trap, passes between its open jaws and throws its load of dirt forwardly against the trigger. This springs the trap, and, as shown in Fig. 2, the jaws catch the gopher effectually.

I am aware that animal-traps made of spring-wire and controlled by triggers are not new, and I do not claim such, broadly, but confine myself to the construction I have shown, whereby I am enabled to provide the simplest and cheapest form of trap, and one which is at the same time effective.

Having thus described my invention, what I claim as new, and desire to secure by Letters Patent, is—

1. An animal-trap consisting of the spring-wire A, bent at its center to form a horizontal coil, $a$, and at its ends to form the semicircular oppositely-curved jaws $a'$, said jaws interlocking, as described, and the trigger B, consisting of a single piece of wire bent to form a loop, $b$, by which it is fitted upon one side of the wire A, and having one of its ends provided with a notch, $b'$, for engaging the other side of said wire, and its other end extending upwardly, substantially as herein described.

2. An animal-trap consisting of the single piece of spring-wire A, bent at its center to form the horizontal coil $a$, and having its ends bent and curved oppositely and at a forward inclination to form the semicircular jaws $a'$, interlocking as described, and the trigger B, made of a single piece of wire bent at right angles, one end being notched and the other broadened or flattened, substantially as herein described.

In witness whereof I have hereunto set my hand.

BERTIE P. JOLLY.

Witnesses:
 M. W. BROWN,
 J. A. GOLDWATER.